United States Patent
Sun et al.

(10) Patent No.: US 12,528,189 B2
(45) Date of Patent: Jan. 20, 2026

(54) CONTROLLING MULTIPLE ROBOTS TO COOPERATIVELY UNLOAD A TRUCK OR OTHER CONTAINER

(71) Applicant: Dexterity, Inc., Redwood City, CA (US)

(72) Inventors: Zhouwen Sun, San Mateo, CA (US); Robert Holmberg, Mountain View, CA (US); Talbot Morris-Downing, Redwood City, CA (US); Harry Zhe Su, Union City, CA (US); Toby Leonard Baker, Redwood City, CA (US); Alberto Leyva Arvayo, Palo Alto, CA (US); Salvador Perez, Jersey City, NJ (US); Samir Menon, Atherton, CA (US)

(73) Assignee: Dexterity, Inc., Redwood City, CA (US)

( * ) Notice: Subject to any disclaimer, the term of this patent is extended or adjusted under 35 U.S.C. 154(b) by 323 days.

(21) Appl. No.: 17/978,608

(22) Filed: Nov. 1, 2022

(65) Prior Publication Data
US 2023/0150137 A1    May 18, 2023

Related U.S. Application Data

(60) Provisional application No. 63/274,464, filed on Nov. 1, 2021.

(51) Int. Cl.
*G06F 17/00* (2019.01)
*B25J 9/00* (2006.01)
(Continued)

(52) U.S. Cl.
CPC ........... *B25J 9/1682* (2013.01); *B25J 9/0093* (2013.01); *B25J 9/1612* (2013.01); *B25J 9/1666* (2013.01); *B25J 9/1697* (2013.01); *B25J 19/023* (2013.01)

(58) Field of Classification Search
CPC ...... B25J 9/1682; B25J 9/0093; B25J 9/1612; B25J 9/1666; B25J 9/1697; B25J 19/023;
(Continued)

(56) References Cited

U.S. PATENT DOCUMENTS 5,015,145 A * 5/1991 Angell ................... G06Q 10/08
414/547
6,330,493 B1   12/2001 Takahashi
(Continued)

FOREIGN PATENT DOCUMENTS

CN    202625405 U  * 12/2012
CN    105751196       7/2016
(Continued)

OTHER PUBLICATIONS

AI-powered software that transforms warehouse robots (Year: 2023).*
(Continued)

*Primary Examiner* — Ronnie M Mancho
(74) *Attorney, Agent, or Firm* — Van Pelt, Yi & James LLP

(57) ABSTRACT

A robotic system is disclosed to control multiple robots to cooperatively load/unload a truck or other container. In various embodiments, image data is received and used to control a first robotic arm and a second robotic arm to load or unload objects into or from the truck or other container, including by loading or unloading one or more of the objects using the first robotic arm and the second robotic arm together to cooperatively to grasp and move each of one or more of the objects along a corresponding trajectory.

18 Claims, 8 Drawing Sheets

(51) Int. Cl.
*B25J 9/16* (2006.01)
*B25J 19/02* (2006.01)

(58) Field of Classification Search
CPC .................. B25J 21/00; B25J 9/0084; G05B 2219/39109
USPC ....................................................... 700/248
See application file for complete search history.

(56) References Cited

U.S. PATENT DOCUMENTS

| | | | |
|---|---|---|---|
| 7,010,390 | B2 | 3/2006 | Graf |
| 9,492,924 | B2* | 11/2016 | Bradski ............... G06T 7/593 |
| 10,192,195 | B1 | 1/2019 | Brazeau |
| 10,556,761 | B2* | 2/2020 | Criswell ............... B65G 67/24 |
| 10,807,805 | B2* | 10/2020 | Clucas ................ B65G 61/00 |
| 11,203,120 | B1* | 12/2021 | Hill ...................... B25J 9/0087 |
| 11,577,916 | B2* | 2/2023 | Condon ................. B25J 5/007 |
| 2002/0029095 | A1 | 3/2002 | Kosaka |
| 2005/0027394 | A1 | 2/2005 | Graf |
| 2005/0055132 | A1 | 3/2005 | Matsumoto |
| 2007/0140821 | A1 | 6/2007 | Garon |
| 2009/0055024 | A1 | 2/2009 | Kay |
| 2010/0239408 | A1 | 9/2010 | Becker |
| 2015/0352721 | A1 | 12/2015 | Wicks |
| 2016/0031084 | A1 | 2/2016 | Yamazaki |
| 2016/0288324 | A1 | 10/2016 | Bradski |
| 2016/0346918 | A1 | 12/2016 | Inutake |
| 2018/0161979 | A1 | 6/2018 | Okamoto |
| 2018/0362270 | A1 | 12/2018 | Clucas |
| 2019/0047148 | A1 | 2/2019 | Fremuth |
| 2019/0047149 | A1 | 2/2019 | Wouhaybi |
| 2019/0315582 | A1 | 10/2019 | Criswell |
| 2020/0055195 | A1 | 2/2020 | Ignakov |
| 2020/0115174 | A1 | 4/2020 | Bangalore Srinivas |
| 2020/0165074 | A1 | 5/2020 | Wagner |
| 2020/0171650 | A1 | 6/2020 | Hallock |
| 2020/0368910 | A1 | 11/2020 | Chu |
| 2020/0405417 | A1 | 12/2020 | Shelton, IV |
| 2021/0046656 | A1 | 2/2021 | Biswas |
| 2021/0122035 | A1 | 4/2021 | Furlan |
| 2021/0146532 | A1 | 5/2021 | Rodriguez Garcia |
| 2021/0201183 | A1 | 7/2021 | Natarajan |
| 2021/0229281 | A1 | 7/2021 | Natarajan |
| 2022/0203542 | A1 | 6/2022 | Garabini |
| 2022/0371186 | A1 | 11/2022 | Zhang |

FOREIGN PATENT DOCUMENTS

| | | |
|---|---|---|
| CN | 109693903 | 4/2019 |
| CN | 112264852 | 1/2021 |
| CN | 112296995 | 2/2021 |
| CN | 111515949 | 8/2021 |
| CN | 113427483 | 9/2021 |
| CN | 113460730 | 10/2021 |
| CN | 111612312 | 12/2023 |
| DE | 102016107268 | 10/2017 |
| DE | 102017117326 | 1/2019 |
| DE | 102019102470 | 8/2020 |
| EP | 3706079 | 9/2020 |
| JP | H1083208 | 3/1998 |
| JP | 2016504983 | 2/2016 |
| JP | 2018094649 | 6/2018 |
| JP | 2019150918 | 9/2019 |
| WO | 2014128493 | 8/2014 |
| WO | 2018091103 | 5/2018 |

OTHER PUBLICATIONS

Miyazaki et al., Object Placement Estimation with Occlusions and Planning of Robotic Handling Strategies, 2017 IEEE International Conference on Advanced Intelligent Mechatronics, Jul. 7, 2017, pp. 602-607.

Romano et al., Human-Inspired Robotic Grasp Control With Tactile Sensing, IEEE Transactions on Robotics, vol. 27, No. 6, Dec. 2011, pp. 1067-1079.

Murali et al., Learning to Grasp without Seeing, arXiv:1805.04201v1, May 10, 2018, 10 pages.

Nunes et al., A taxonomy for task allocation problems with temporal and ordering constraints, Robotics and Autonomous Systems 90, 2017, pp. 55-70.

Nunes et al., Multi-Robot Auctions for Allocation of Tasks with Temporal Constraints, Twenty-Ninth AAAI Conference on Artificial Intelligence, vol. 29 No. 1, 2015, pp. 2110-2116.

* cited by examiner

CONTROLLING MULTIPLE ROBOTS TO COOPERATIVELY UNLOAD A TRUCK OR OTHER CONTAINER

CROSS REFERENCE TO OTHER APPLICATIONS

This application claims priority to U.S. Provisional Patent Application No. 63/274,464 entitled CONTROLLING MULTIPLE ROBOTS TO COOPERATIVELY UNLOAD A TRUCK OR OTHER CONTAINER filed Nov. 1, 2021 which is incorporated herein by reference for all purposes.

BACKGROUND OF THE INVENTION

Robots have been provided to perform a variety of tasks, such as manipulating objects. For example, a robotic arm having an end effector may be used to pick and place items. Examples of commercial applications of such robots include sortation, kitting, palletization, depalletization, truck or container loading and unloading, etc.

In some contexts, the objects to be handled vary considerably in size, weight, packaging, and other attributes. Typically, a robotic arm is rated to handle up to a maximize size, weight, etc. of object. In some contexts, the conventional approach may require a robotic arm able to handle the largest, heaviest, and/or otherwise most difficult object that may be required to be handled.

In some contexts, such as loading or unloading a truck or other container, the workspace constrains robot movement. For example, the system must limit the range of movement of the robotic arm to avoid having any part of the robot collide with the inner walls of the truck or container or other obstacles in the workspace. In addition, to work inside a truck or other container a robot must be able to fit and move within the constrained interior space, limiting the size and lifting capacity of an individual robot deployed to work in such a space.

BRIEF DESCRIPTION OF THE DRAWINGS

Various embodiments of the invention are disclosed in the following detailed description and the accompanying drawings.

DETAILED DESCRIPTION

Figure 1:
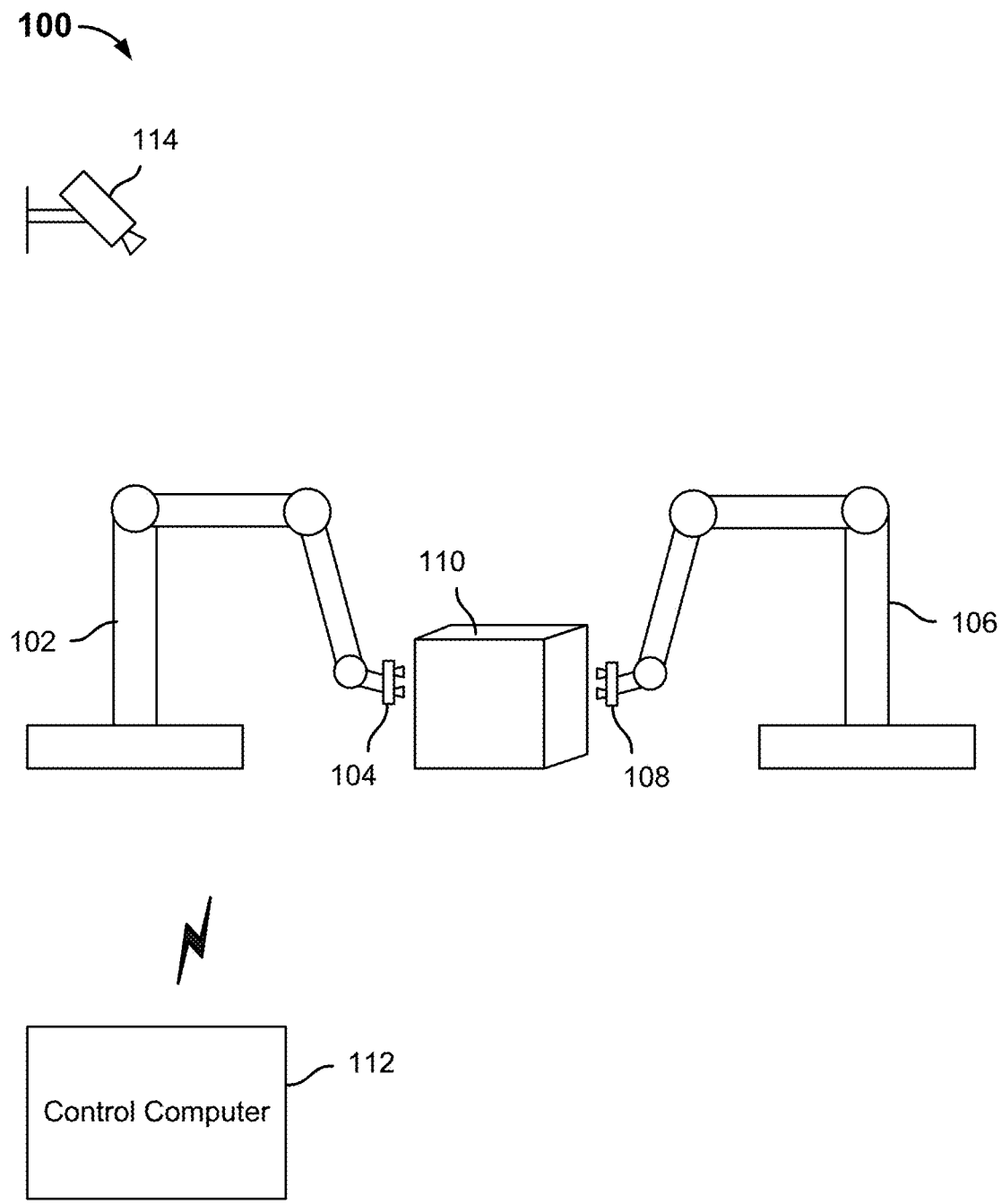
FIG. 1 is a block diagram illustrating an embodiment of a robotic system configured to control a plurality of robots to perform a task cooperatively.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic system is disclosed to control and use multiple robots, e.g., two or more robotic arms, to cooperatively unload or load a truck or other container. In various embodiments, robotic arms mounted on a frame or other structure are positioned in a truck or other container. To unload, the robots pick items from the truck and place them on a robotically controlled conveyor or other conveyance. For heavy or bulky items, two or more robots are used cooperatively to pick the item and place it on the conveyor or other destination. As unloading of a region of the truck or other container is completed, e.g., items within reach of the robots have all been unloaded but more items remain, the frame and robotic arms mounted thereon, and the conveyor, are extended (robotically) further into the truck or other container, and items comprising a next set of items within reach of the robotic arms are moved. To load, the frame/ robots and conveyor are extended into the truck or other container, to a position near a far/back end of the truck/container, and the robots work cooperatively to load items into the truck/container as they arrive via the conveyor.

In various embodiments, a system as disclosed herein includes two robots with a conveyor or conveyors where packages are placed [picked] between them.

Most general robot arms that are mounted near a wall are prone to have a part of their arm (e.g., robot elbow) collide with the wall when moving the robot endpoint/load to a location on the opposite side of the robot from the wall. The problem is especially bad when using the most common type of industrial robots with kinematics with the first three joints in a roll-pitch-pitch configuration. The problem is exacerbated when using two of these arms such that they are placed side by side with an intervening conveyor and are therefore much closer to the walls of the truck than a single robot/conveyor system. The below description matches the robot locations and tasks that are part of this system as implemented in various embodiments.

In various embodiments, each robot base is mounted on a mounting surface that is angled away from the nearby wall of the truck or other container. An angle of the mounting surface 10°-20° from level, in various embodiments, greatly decreases the potential collision between the robot elbow and the truck wall. This greatly increases the usable workspace to pick packages in front of the robot and to place boxes on a conveyor or conveyors near the midline of the truck. In various embodiments, this placement of each robot's workspace greatly increases the usable (non-wall-collision) joint workspace of two robots to cooperatively pick packages as described above.

In various embodiments, robots move, or are moved, into the container/truck, as they unload packages and clear out space, they move, or are moved, further into the truck. In some embodiments, they are attached to a conveyor belt which moves along with the robots, and onto which the robots place the picked packages to remove them from the truck. Alternatively, there may be a central aisle way between the robots where a series of robot vehicles may park to receive packages placed on them to be carried out of the truck and/or in which a robotically controlled conveyor may be positioned and controlled.

A vision system identifies pickable packages in the scene, which it provides to the robots. The robots then prioritize picking the packages so they do not get too close to one another, to prevent collisions between the robots. Motion planning allows the robots to plan paths that avoid colliding the robots. In some embodiments, a hierarchical planner/scheduler enables each robot to plan its movements with knowledge of what the other robots plan to do, and potential collisions can be avoided and/or identified to trigger replanning by one or both robots.

In cases with only one output belt to place on, the robots alternate placing, to prevent collisions. In cases where each robot has its own output belt, they are allowed to operate at their own speed and do not need to synchronize their place motions.

In some embodiments, for objects stacked to the top of the truck/container, the robots may pick them from the side. Lower objects are generally picked from the top. Large or irregular objects are picked collaboratively with both robots.

In the case of truck or container loading, in various embodiments, initially robots move, or are moved, fully into the container/truck. As they load packages and build out the load, they move, or are moved, further out of the truck. In various embodiments, the robots may be attached to and/or otherwise work in conjunction with a robotically controlled conveyor belt which moves along with the robots, and from which the robots pick the packages to load into the truck. Packages may be fed to the conveyor located between the robots from a conveyor or other conveyance structure that extends from the truck/container into a loading dock or other area outside the truck. Packages may be fed into the input conveyance structures by human workers or other robots, for example.

Picking from a disordered jumble/pile of packages, as may occur when unloading a trucking having a variety of items packed therein, may cause other packages to move/tumble/fall. In some embodiments, a vision system is used to identify the new configuration and target a next package before the next pick is made.

In some embodiments, to get access to grasp a package that is out of reach, such as one at the top of a stack of packages, the system may identify, plan, and pick packages not on the top to cause a higher, out of reach package(s) to move (e.g., due to gravity) to a lower, pickable location.

FIG. 1 is a block diagram illustrating an embodiment of a robotic system configured to control a plurality of robots to perform a task cooperatively. In the example shown, system and environment 100 includes a first robotic arm 102 equipped with a suction-type end effector 104 and a second robotic arm 106 equipped with a suction-type end effector 108. In the state shown, robotic arm 102 and robotic arm 106 are positioned to perform cooperatively a pick and place task with respect to a large box 110. A control computer 112 is configured to communicate wirelessly with one or more of the robotic arm 102, robotic arm 106, and one or more cameras or other sensors 114 in the workspace. Image data received from camera 114, for example, may be used by the control computer 112 to generate a three-dimensional view of the workspace and to send commands and information to the robotic arm 102 and robotic arm 106, as appropriate, to facilitate the cooperative pick and place task.

Figure 2A:
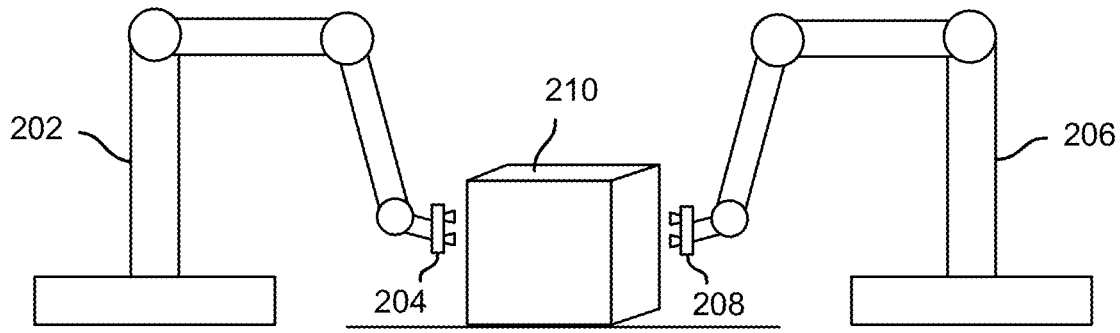
FIGS. 2A-2C illustrate an example of a cooperative pick and place task performed in an embodiment of a robotic system as disclosed herein.
Figure 2B:
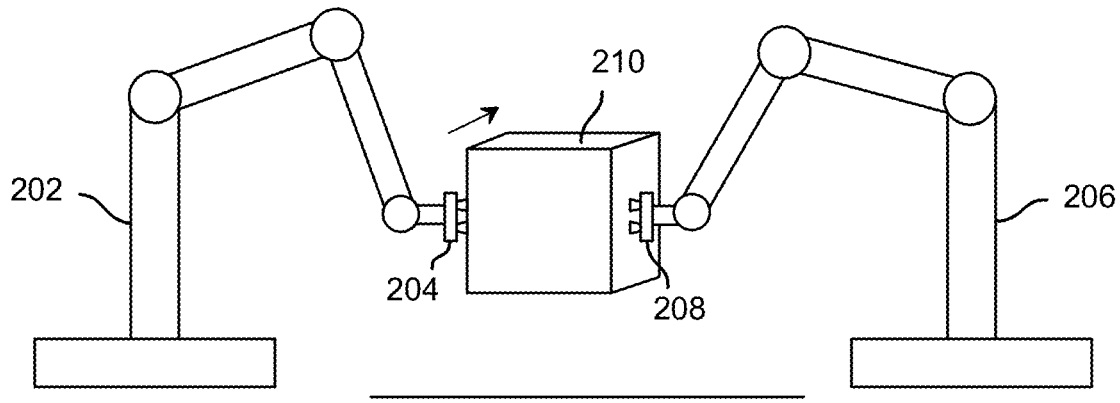
Figure 2C:
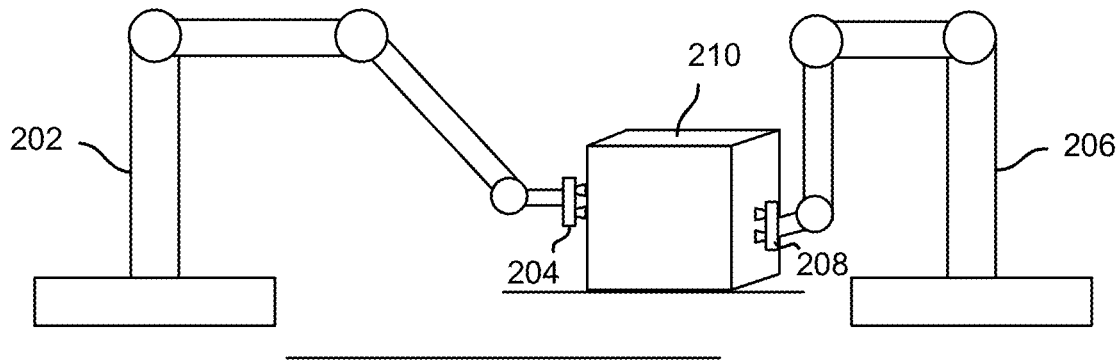

FIGS. 2A-2C illustrate an example of a cooperative pick and place task performed in an embodiment of a robotic system as disclosed herein. In the example shown, in FIG. 2A robotic arm 202 with suction type end effector 204 and robotic arm 206 with suction type end effector 208 are positioned to begin to perform cooperatively a pick and place task with respect to large box 210, similar to the starting state shown in FIG. 1. In various embodiments, robotic arm 202 may be the "leader" and robotic arm 206 the "follower" in a cooperative pick and place as disclosed herein. The "leader" may be selected by any suitable method, such as by assigning the "leader" role to the robot that initiated the cooperative task, by assigning the role randomly to one or the other of the participating robots, by an "election" or other selection method.

To initiate the operation, in various embodiments, as "leader" robotic arm 202 would move its end effector 204 to the position shown and would then grasp the box 210, e.g., by moving the end effector 204 into a position in contact or nearly in contact with the side of box 210 and applying suction. A signal may be sent to the other robot (and/or a process to control the other robot) to indicate that the leader has completed its grasp. The follower, e.g., robotic arm 206 in this example, would then grasp the box 210, e.g., at a side opposite from the side at which the leader (i.e., robotic arm 202) had grasped the box 210. The follower would record a transform based on the position and orientation of the leader's end effector 204 and the relevant dimension of box 210. For example, the vision system and/or other sensors may be used to measure the dimension, or to recognize the box 210 (e.g., specifically and/or by type) and to use the item and/or type information to determine the dimension, e.g., by look up.

As shown in FIG. 2B, once both robots (202, 206) have grasped box 210. The leader, robotic arm 202 in this example, computes and moves the box along a trajectory determined by robotic arm 202 (and/or a control process associated therewith) independently of the follower robotic arm 206. In various embodiments, the follower robot, robotic arm 206 in this example, receives (e.g., periodically, continuously, etc.) position and orientation information for the end effector 204 of leader robotic arm 202. The follower robotic arm 206 (and/or a control process associated therewith) uses the position and orientation information of the leader robot (202, 204) and the previously-determined and recorded transform to compute a new target position and orientation for the follower's end effector 208, and computes and applies torques to motors comprising robotic arm 206 as needed to minimize the error (difference) between the current position and orientation of the follower's end effector 208 and the (most recently updated) target.

Once the object (box 210) has been placed in the destination position, as shown in FIG. 2C for example, the leader robot (robotic arm 202) releases its grasp and informs the follower that the pick and place task has been completed. In response, the follower (robotic arm 206) releases its grasp and both robots (202, 206) are free to perform other work, such as (returning to) independently picking and placing smaller/lighter objects and/or cooperatively performing a next pick and place task for another large or heavy object.

Figure 3:
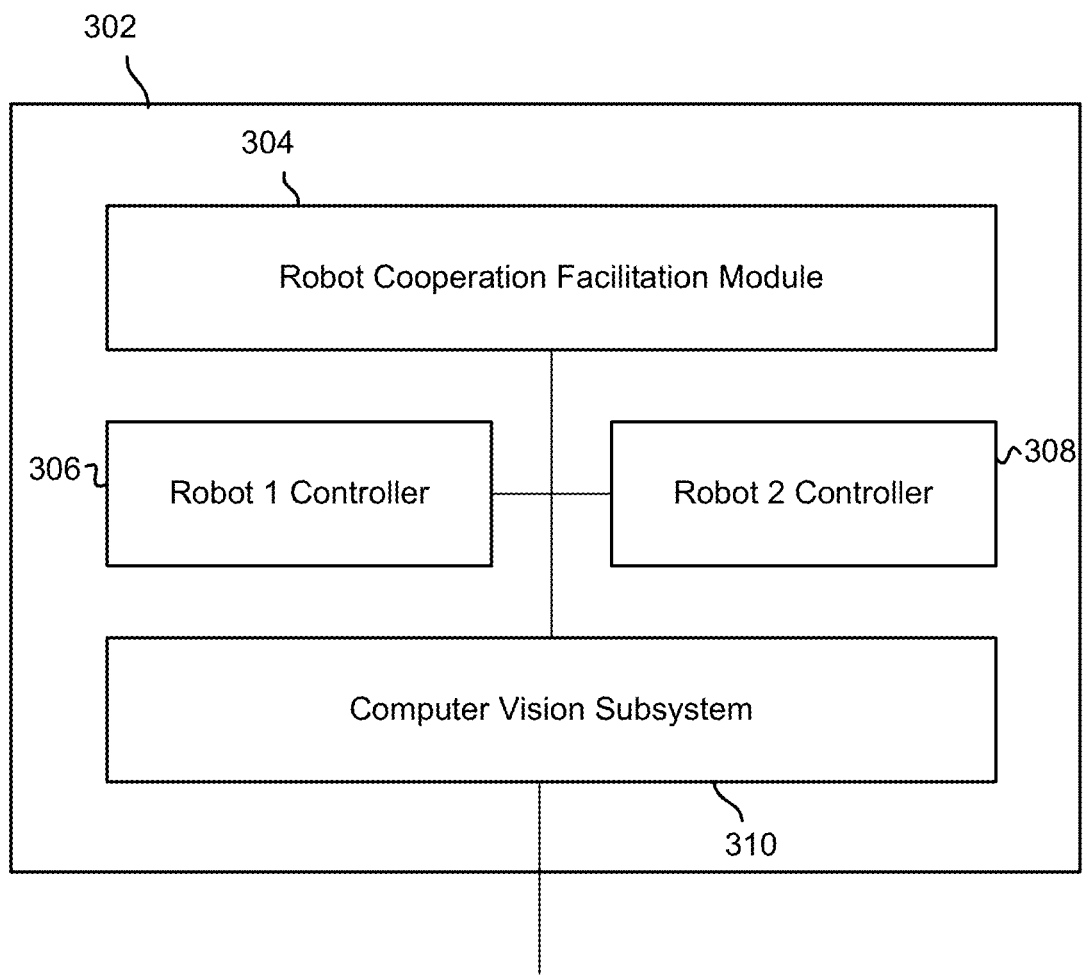
FIG. 3 is a block diagram illustrating an embodiment of a robotic control system.

FIG. 3 is a block diagram illustrating an embodiment of a robotic control system. In various embodiments, the robotic control system 302 of FIG. 3 includes or is included in the control computer 112 of FIG. 1. In various embodiments, one or more modules or subsystems comprising the robotic control system 302 of FIG. 3 may be distributed across multiple computing nodes, such as computers and/or processors comprising one or more of control computer 112, robotic arm 102, and/or robotic arm 106 of FIG. 1.

In the example shown, robotic control system 302 includes a hierarchical planner, scheduler, and/or control module comprising a robot cooperation facilitation module 304 configured to facilitate cooperative performance of tasks by two or more robots, as disclosed herein, and robot-specific controllers 306 and 308. For example, robot 1 controller 306 may be associated with robotic arm 102 of FIG. 1 and/or robotic arm 202 of FIGS. 2A through 2C, while robot 2 controller 308 may be associated with robotic arm 106 of FIG. 1 and/or robotic arm 206 of FIGS. 2A through 2C.

In various embodiments, the respective robots associated with robot 1 controller 306 and robot 2 controller 308, respectively, each may operate independently, e.g., to pick and place objects the robot is able to handle singly. In various embodiments, cooperative tasks using two or more robots may be initiated and/or performed by one or more of communications sent between robot 1 controller 306 and robot 2 controller 308; bilateral communications between robot cooperation facilitation module 304, on the one hand, and the respective robot 1 controller 306 and robot 2 controller 308, on the other; and/or communications among all three (or more) entities.

In the example shown, robotic control system 302 further includes a computer vision subsystem 310 configured to receive image and depth data from one or more 3D cameras and/or other sensors, such as camera 114 of FIG. 1, and to use the received data to generate and/or update a three-dimensional view of the workspace. The output of the computer vision subsystem 310 may be provided to one or more of the robot cooperation facilitation module 304, robot 1 controller 306, and robot 2 controller 308, to enable them to initiate and perform cooperatively a task to pick and place an item. For example, image data may be used to determine that a box or other object is too large and/or too heavy for a single robot to pick and place. The three-dimensional view of the workspace and objects within may also be used to determine respective grasp strategies and/or locations for each robot, to determine collision-free trajectories to move each robot's end effector to its corresponding pick location, and to determine a collision-free trajectory through which to cooperatively move the object to the destination location at which it is to be placed, for example.

Figure 4:
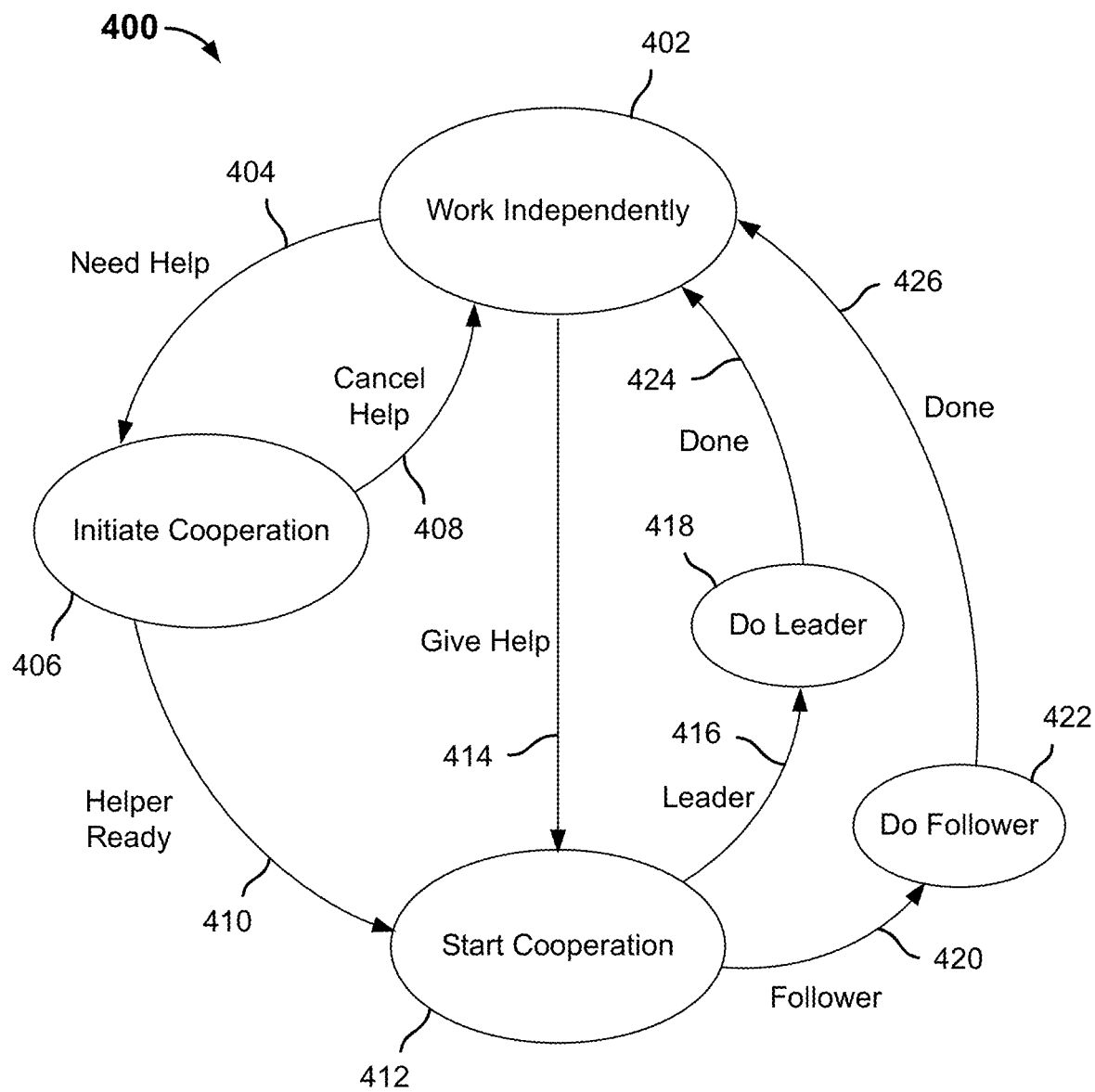
FIG. 4 is a state diagram illustrating an embodiment of a robotic system configured to control a plurality of robots to perform a task cooperatively.

FIG. 4 is a state diagram illustrating an embodiment of a robotic system configured to control a plurality of robots to perform a task cooperatively. In various embodiments, the state diagram 400 of FIG. 4 may be implemented by and/or with respect to a robot configured to cooperatively perform an operation using two or more robots. In some embodiments, the state diagram 400 of FIG. 4 may be implemented by control computer 112 of FIG. 1 and/or one or more of robot cooperation facilitation module 304, robot 1 controller 306, and robot 2 controller 308 of FIG. 3.

In the example shown, in state 402 a robot works independently to perform tasks. For example, the robot may independently pick and place items, such as to fill a box or other receptacle in a kitting operation, place items on a conveyer belt or other conveyance in a sortation operation, stack items on a pallet, etc. Upon receiving an indication that help is needed to perform a task (404), such as an indication that an item that has been perceived and which needs to be picked and placed is too large to grasp and move with one robot, the robot and/or controller transitions to a state 406 in which cooperative performance of the task is initiated. For example, a communication may be sent to another robot (e.g., from robot 1 controller 306 to robot 2 controller 308 of FIG. 3) or to a higher-level planner/scheduler (e.g., robot cooperation facilitation module 304 of FIG. 3), or the higher-level planner/scheduler may recognize the need for cooperative performance of the task and may initiate the transition to state 406.

In the example shown, the robot and/or controller may transition back to working independently in state 402, via a "cancel help" transition 408. For example, the robot/controller and/or a higher-level planner/scheduler may determine that the task has already been performed by and/or assigned to one or more other robots.

In some embodiments, in the "initiate cooperation" state 406, the robot/controller that is initiating cooperative performance of the task communicates directly or indirectly with a helper robot, e.g., by requesting help. Another robot may be assigned to help and/or may agree to help. The robot may be assigned and/or agree to help at a future time or upon occurrence of a future condition, such as completion of a task the helper robot has already started and/or a task that has higher priority. For example, a task to clear other objects from around the large or heavy object, to facilitate the cooperative task, may have a higher priority and therefore may be completed first. Once the helper robot is ready to perform the cooperative task, the helper robot informs the task initiator, directly or indirectly (e.g., via a higher-level planner/scheduler, such as robot cooperation facilitation module 304 of FIG. 3), that the helper robot is ready, prompting a transition 410 to "start cooperation" state 412. The helper may transition directly from working independently, in state 402, to "start cooperation" state 412, via the "give help" transition 414 in the example shown.

Once all participating robots are ready in the "start cooperation" state 412, a "leader" is determined, if needed, and the leader transitions (416) to "do leader" state 418 while the follower(s) transition (420) to "do follower" state 422. In the "do leader" state 418 and "do follower" state 422, the leader and follower(s) cooperate as disclosed herein to cooperative perform the task, such as to pick and place a large or heavy object, as in the example illustrated in FIG. 2A through 2C. Once the task has been completed, the leader and follower(s) transition (424, 426) back to the "work independently" state 402 and resume working independently.

Figures 5A, 5B:
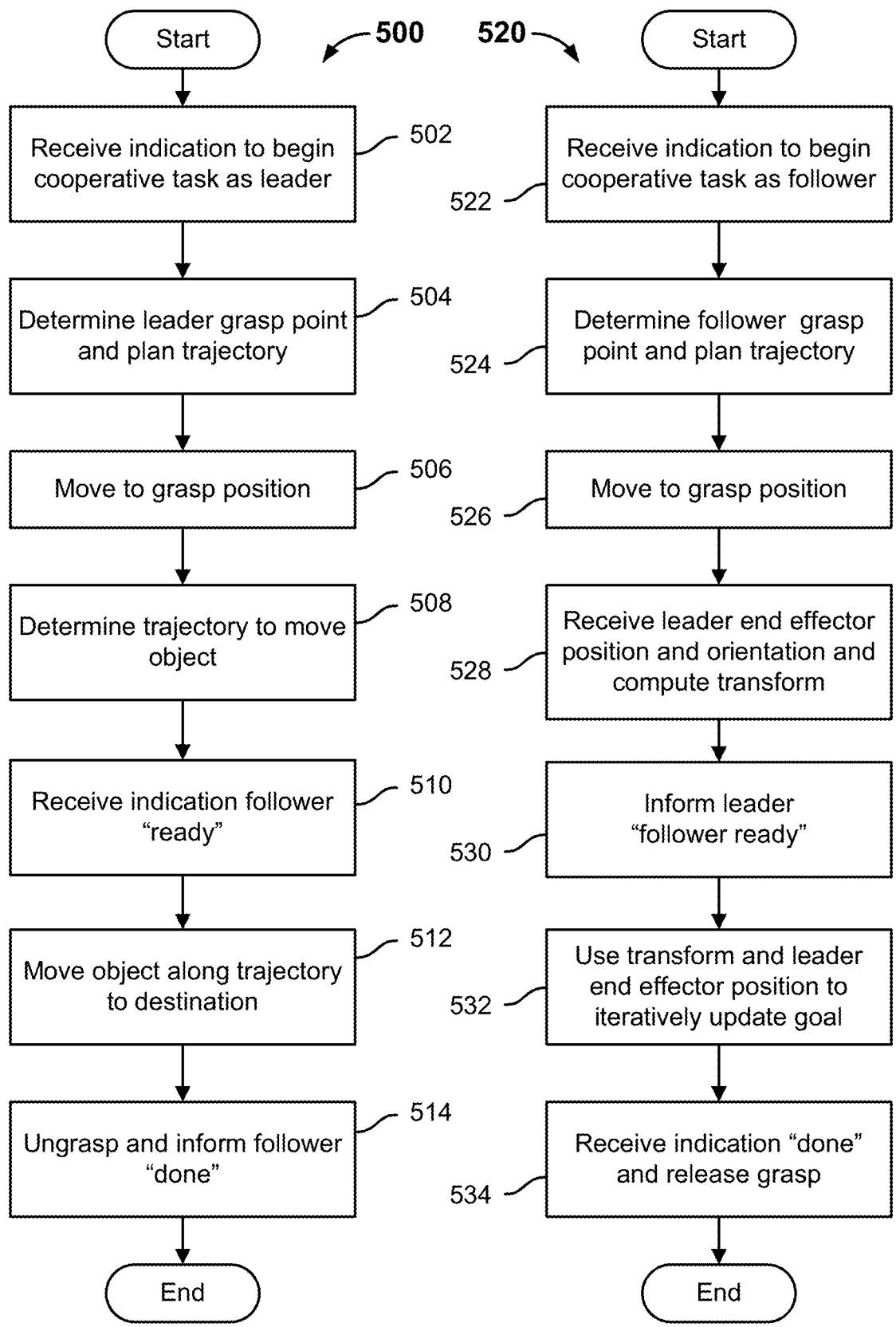
FIG. 5A is a flow diagram illustrating an embodiment of a process to cooperatively perform a task as a "leader" robot in an embodiment of a robotic system as disclosed herein.
FIG. 5B is a flow diagram illustrating an embodiment of a process to cooperatively perform a task as a "follower" robot in an embodiment of a robotic system as disclosed herein.

FIG. 5A is a flow diagram illustrating an embodiment of a process to cooperatively perform a task as a "leader" robot in an embodiment of a robotic system as disclosed herein. In various embodiments, process 500 of FIG. 5A may be implemented by a robot controller associated with a robot that is participating as the "leader" in cooperative performance of a task by two or more robots as disclosed herein.

In the example shown, at 502 an indication to begin a cooperative task (with one or more other robots) in the role of "leader" is received. For example, an indication to cooperatively perform a pick and place task may be received. At 504, the leader determines a location at which to grasp the object and plans a trajectory to safely move its end effector into position to grasp the object and at 506 the leader moves its end effector along the trajectory to the grasp position. At 508, the leader determines (independently of any other robot) a trajectory to move the object to an associated destination. For example, a model of the robot and its kinematics and image and/or other information about the workspace (e.g., configuration data, CAD files, etc.), one or more attributes of the object (e.g., dimensions, rigidity, etc.), and image/sensor data may be used to plan the trajectory. At 510, an indication is received from the "follower" robot(s) with which the robot implement process 500 is to cooperate that the follower robot(s) is/are ready to begin cooperative performance of the task. In response, at 512 the "leader" robot moves its end effector (and the object in the joint grasp of the leader and follower(s)) to the destination along the trajectory determined by the leader. At 514, upon placing the object at the destination the leader robot releases its grasp and informs the follower robot(s) that the task has been completed. In various embodiments, the leader then resumes operating independently.

FIG. 5B is a flow diagram illustrating an embodiment of a process to cooperatively perform a task as a "follower" robot in an embodiment of a robotic system as disclosed herein. In various embodiments, process 520 of FIG. 5B may be implemented by a robot controller associated with a robot that is participating as the "follower" in cooperative performance of a task by two or more robots as disclosed herein.

In the example shown, at 522 an indication is received to begin performing a task cooperatively with one or more other robots in the "follower" role, as disclosed herein. At 524, the follower determines a grasp point—e.g., one on an opposite side of the object from the side at which the "leader" has indicated it will grasp the object—and plans a trajectory to move into position to grasp the object at that point. At 526, the follower moves its end effector to the determined grasp position and grasps the object, e.g., in response to receiving an indication that the leader has completed its grasp. At 528, the leader's end effector position and orientation information are received, and the follower uses this information along with information about the object (e.g., the size of the object in the dimension that separates the leader's end effector and the follower's end effector) and computes a transform. In various embodiments, the transform comprises a matrix or other mathematical construct that can be applied to the position and orientation of the leader's end effector, typically expressed in the leader's frame of reference, to provide a corresponding position and orientation for the follower's end effector that would maintain the relative position and orientation of the follower's end effector with respect to the leader's end effector as the end effectors and the object grasped between them are moved through the workspace to the destination at which the object is to be placed. At 530, the follower robot informs the leader that the follower is "ready", e.g., the follower has grasped the objected, computed the transform, and is ready to maintain the position of its end effector relative to (e.g., opposite) the leader's end effector.

At 532, as the leader robot begins to move along the trajectory determined independently by the leader, the follower uses the transform it computed and successively received position and orientation information for the leader's end effector, as it is moved through the workspace. For example, for each of at least a subset of the received positions and/or orientations of the leader's end effector, the follower computes a new goal position and/or orientation for its own end effector and applies torques to it motors as determined to be needed to minimize the error (e.g., difference) between the current position and/or orientation of its end effector and the current goal.

At 534, the follower receives an indication (e.g., from the leader) that the cooperative task is "done", in response to which the follower releases its grasp and the process 520 ends.

Figure 6A:
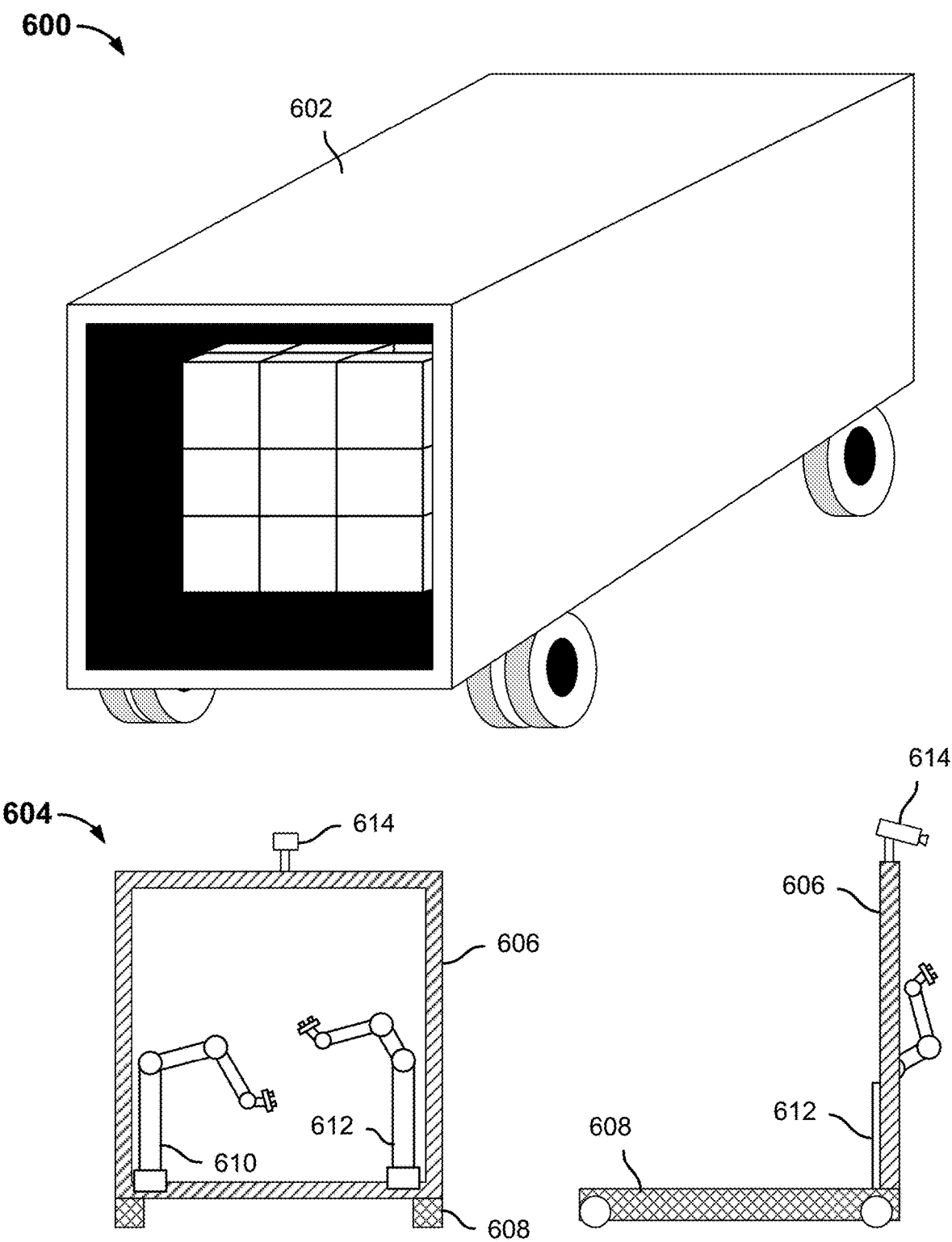
FIG. 6A is a diagram illustrating an embodiment of a system to control multiple robots to cooperatively load/unload a truck or other container.

FIG. 6A is a diagram illustrating an embodiment of a system to control multiple robots to cooperatively load/unload a truck or other container. In the example shown, system and environment 600 includes a truck or other container 602 with many boxes stacked inside. While the boxes as shown in FIG. 6A are uniform in size and regular in their dimensions, in various embodiments the payload may include objects of varying sizes, weight, rigidity, packaging type, and other attributes. While the boxes shown in FIG. 6A are neatly stacked, in various embodiments the payload may include a disorganized pile of items or a mix of relatively more organized and less organized sets of items.

FIG. 6A includes at bottom a rear view (bottom left) and side view (bottom right) of a robotic truck loading/unloading system 604. In the example shown, robotic truck loading/unloading system 604 includes a frame 606 dispose on a moveable and/or mobile chassis 608. In some embodiments, chassis 608 enables the robotic truck loading/unloading system 604 to be moved manually into position, such as by being pushed into position by human or robotic workers. In some embodiments, the chassis 608 is self-propelled and may be positioned (e.g., advanced into or backed out of a truck or other container) under robotic control. For example, once positioned manually in the deepest part of a truck or container (for loading) or at the rear access opening (for unloading), the chassis 608 may be propelled under robotic control to advance as needed to continue unloading or back out to a new position to continue loading.

Referring to FIG. 6A, in the example shown a first robot 610 and second robot 612 are positioned on opposite sides of an aperture (opening) defined by the frame 606. In various embodiments, the robots 610, 612 are controlled to cooperatively load/unload a truck or other container, as disclosed herein. A 3D camera 614 mounted on the top cross member of frame 606 provides image and depth information usable by a computer vision system, such as computer vision subsystem 310 of FIG. 3, to provide a three-dimensional view of the interior workspace in which the robotic truck loading/unloading system 604 is currently using the robots 610, 612 cooperatively to load or unload the truck.

Figure 6B:
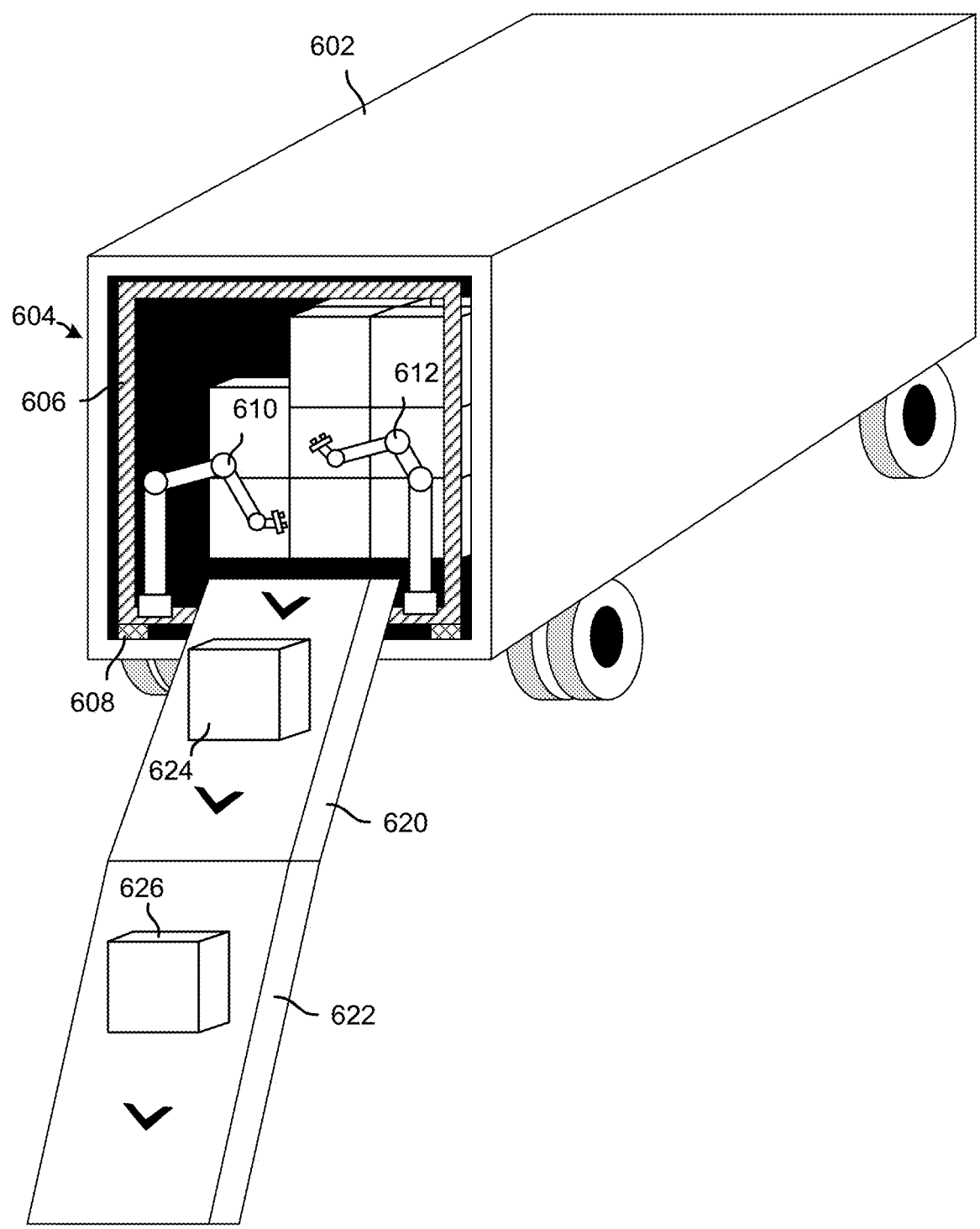
FIG. 6B is a diagram illustrating an embodiment of a system to control multiple robots to cooperatively load/unload a truck or other container.

FIG. 6B is a diagram illustrating an embodiment of a system to control multiple robots to cooperatively load/unload a truck or other container. In the example and state shown, the robotic truck loading/unloading system 604 of FIG. 6A has been positioned in the rear opening of a fully loaded truck 602. For example, truck 602 may have arrived at and backed into a loading dock or bay, such as at a warehouse or distribution center. A robotically controlled conveyor 620 is positioned to feed to a downstream location boxes unloaded from the truck 602 and placed on conveyor 620 by the robotic truck loading/unloading system 604. In some embodiments, the conveyor 620 comprises a component and/or system separate from the robotic truck loading/unloading system 604 and which is moved into a position between the robots 610, 612, e.g., after the robotic truck loading/unloading system 604 has been moved into position. In other embodiments, the conveyor 620 comprises an integral part of the robotic truck loading/unloading system 604 and remains in position between the robots 610, 612 as the chassis 608 is moved to position the robotic truck loading/unloading system 604, e.g., as shown.

In the example and state shown in FIG. 6B, conveyor 620 feeds boxes onto a further conveyor 622, which carries the boxes (e.g., boxes 624, 626) to a further downstream position. At the further downstream position, other workers (e.g., humans, other robots) may perform further tasks with respect to boxes unloaded from truck 602, such as to unpack them, further move them to storage or staging locations, send them on for transportation to other destinations, etc.

Figure 6C:
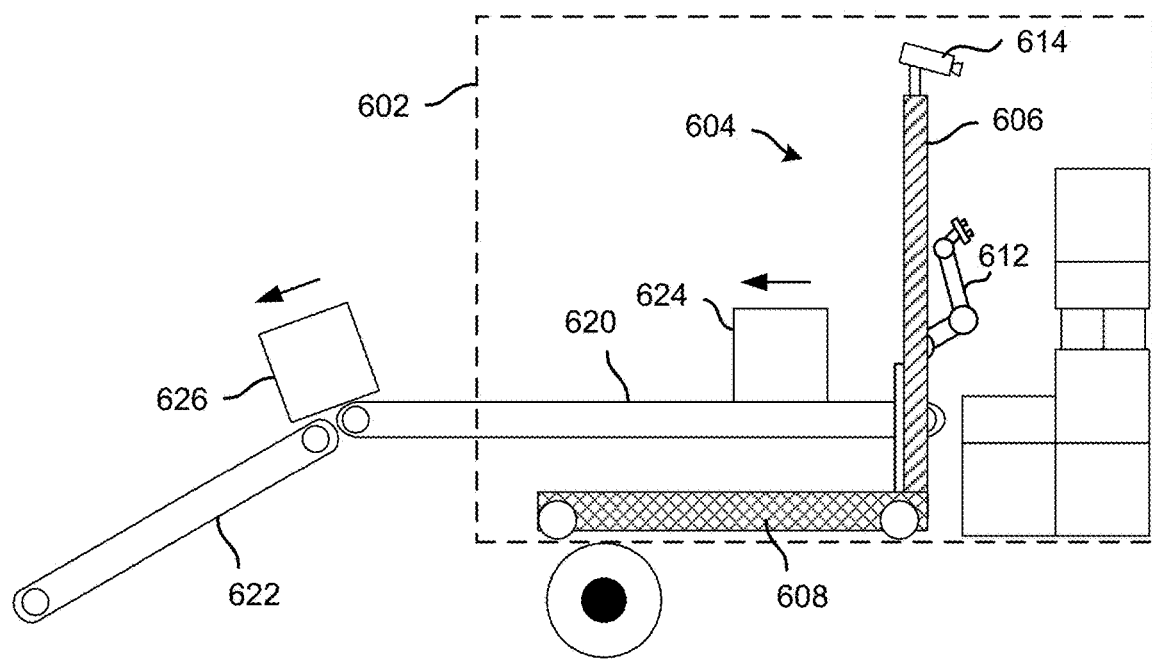
FIG. 6C is a diagram illustrating an embodiment of a system to control multiple robots to cooperatively load/unload a truck or other container.

FIG. 6C is a diagram illustrating an embodiment of a system to control multiple robots to cooperatively load/unload a truck or other container. In FIG. 6C, the outline of the truck 602 is shown in a dashed line and robotic truck loading/unloading system 604 is shown in a position deep within the truck 602, continuing an unloading operation. As shown, boxes of varying sizes remain stacked within truck 602. Boxes 624 and 626 have been picked from within the truck by the robots 610, 612 and placed on conveyor 620, which carries them out of the truck 602 and deposits them onto conveyor 622, in this example.

In various embodiments, as the robotic truck loading/unloading system 604 continues to unload the truck 602, once boxes within reach have been unloaded if further boxes remain to be unloaded the robotic truck loading/unloading system 604 advances, e.g., under robotic control and self-propulsion, further into the truck 602 to put robots 610, 612 in position to reach a next layer or other range or set of boxes or other objects.

In various embodiments, a robotic truck loading/unloading system as disclosed herein, such as robotic truck loading/unloading system 604, is configured to use two or more robots to cooperatively perform a task in connection with a truck (or other container) loading/unloading operation. For example, the robots 610, 612 may work independently to load or unload objects that can be handled safely by a single robot but may be used to cooperatively perform a task to load or unload a large, bulky, and/or heavy box or other object.

Figure 7A:
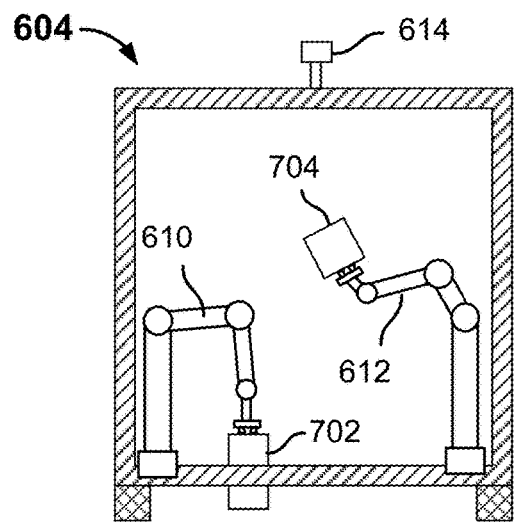
FIG. 7A is a diagram illustrating an example of robots working independently in an embodiment of a system to control multiple robots to cooperatively load/unload a truck or other container.

FIG. 7A is a diagram illustrating an example of robots working independently in an embodiment of a system to control multiple robots to cooperatively load/unload a truck or other container. In the example shown, the robots 610, 612 are being used to independently load/unload objects, such as boxes 702, 704, in an independent mode of operation, e.g., as in state 402 of FIG. 4. In various embodiments, the robots 610, 612 work independently but in a cooperative way when operating in the "independent" work mode. For example, in various embodiments, the robots 610, 612 alternate picking and placing items, to reduce the risk of collision or having to wait to avoid collision. As one robot (e.g., 610) is placing an item on the conveyor 620, the other robot (e.g., 612) may be reaching to grasp a next item to be grasped by that robot. By the time the latter robot is ready to place, the former robot has moved clear of the place region of the conveyor. In some embodiments, each robot 610, 612 takes the other robot's planned trajectories into consideration in planning its own trajectory. For example, each may plan a trajectory that avoids intersecting a trajectory another robot plans to traverse. In some embodiments, if a risk of collision is detected, one or both robots may enter a short wait period, each of a separately determined random length, before resuming operation.

Figure 7B:
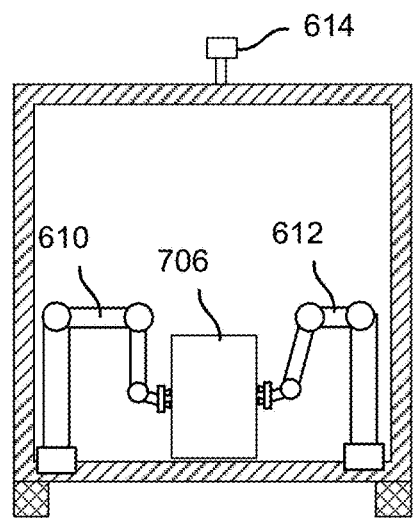
FIG. 7B is a diagram illustrating an example of robots working cooperatively in an embodiment of a system to control multiple robots to cooperatively load/unload a truck or other container.

FIG. 7B is a diagram illustrating an example of robots working cooperatively in an embodiment of a system to control multiple robots to cooperatively load/unload a truck or other container. In the example shown, the robots 610, 612 are being used to cooperatively load/unload a large box 706. In the example and state shown, the robots 610, 612 have grasped the box 706 on opposite sides. Techniques disclosed above are used by one or more of robotic truck loading/unloading system 604, robot 610, and robot 612, to move box 706 to perform the required task, e.g., stacking box 706 on one or more other boxes to load truck 602 or placing box 706 on conveyor 620 (not shown in FIG. 7B, for clarity) to unload. For example, robot 610 may operate as the "leader", implementing process 500 of FIG. 5A, while robot 612 may serve as the "follower", implementing process 520 of FIG. 5B, or vice versa.

In various embodiments, techniques disclosed herein may be used to control multiple robots to cooperatively load/unload a truck or other container.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
   a frame that defines an aperture having dimensions associated with a set of inner dimensions defined by one or more of the top, bottom, and sidewalls of a truck or other container;
   a first robotic arm and a second robot arm each mounted on the frame on opposite sides of the aperture;
   a camera mounted on the frame; and
   a control computer configured to use the first robotic arm and the second robotic arm and image data received from the camera to load or unload objects into or from the truck or other container, including by:
   determining based on said image data received from the camera that a selected object is too large or heavy to move with a single robotic arm; and
   in response to the determination that selected object is too large or heavy to move with a single robotic arm, using the first robotic arm and the second robotic arm cooperatively to each grasp the selected object and move the selected object together along a trajectory while maintaining the selected object in the grasp of both the first robotic arm and the second robotic arm.

2. The system of claim 1, wherein the control computer implements a first process to operate the first robotic arm in a leader mode of operation and a second process to operate the second robotic arm in a follower mode of operation to cooperatively to grasp and move the one or more objects along a trajectory.

3. The system of claim 1, wherein the first robotic arm and the second robotic arm are configured to be used independently to load or unload objects when not being used to cooperatively to grasp and move the one or more objects along a trajectory.

4. The system of claim 3, wherein the first robotic arm and the second robotic arm are configured to operate independently in a manner that avoids collisions between them.

5. The system of claim 1, further comprising a chassis on which the frame is mounted.

6. The system of claim 5, wherein the chassis is self-propelled.

7. The system of claim 6, wherein the control computer is configured to advance the chassis into the truck or other container to access objects located more deeply within the truck or other container.

8. The system of claim 6, wherein the control computer is configured to back the chassis out of the truck or other container to position the robotic system to load objects into a next available set of locations within the truck or other container.

9. The system of claim 1, further comprising a conveyor positioned between the first robotic arm and the second robotic arm.

10. The system of claim 9, wherein the control computer is configured to operate the conveyor to move items into position to be loaded by the first robotic arm and the second robotic arm.

11. The system of claim 9, wherein the control computer is configured to operate the conveyor to move to a downstream location items unloaded using the first robotic arm and the second robotic arm.

12. The system of claim 1, wherein the first robotic arm is operated in a leader mode of operation and the second robotic arm is operated in a follower mode of operation in which a transform is applied to successive sets of position and orientation information for a first end effector of the first robotic arm to determine an updated goal position and orientation for a second end effector of the second robotic arm.

13. The system of claim 1, wherein the control computer is configured to use one or both of the first robotic arm and the second robotic arm to remove a first object from a lower layer of a stack to cause a second object at a higher layer above the lower layer to move into a position from which one or both of the first robotic arm and the second robotic arm can reach the object.

14. A method, comprising:
receiving image data from a camera; and
using the image data to control a first robotic arm and a second robotic arm to load or unload objects into or from a truck or other container, including by:
determining based on said image data received from the camera that a selected object is too large or heavy to move with a single robotic arm; and
in response to the determination that selected object is too large or heavy to move with a single robotic arm, using the first robotic arm and the second robotic arm cooperatively to each grasp the selected object and move the selected object together along a trajectory while maintaining the selected object in the grasp of both the first robotic arm and the second robotic arm.

15. The method of claim 14, wherein the first robotic arm is used in a leader mode of operation and the second robotic arm is used in a follower mode of operation to cooperatively to grasp and move the one or more objects along a trajectory.

16. The method of claim 14, wherein the first robotic arm and the second robotic arm are mounted on a chassis and further comprising advancing the chassis into the truck or other container to access objects located more deeply within the truck or other container.

17. The method of claim 14, further comprising operating a conveyor to move items into position to be loaded by the first robot and the second robot.

18. A computer program product embodied in a non-transitory computer readable medium and comprising computer instructions for:
receiving image data from a camera; and
using the image data to control a first robotic arm and a second robotic arm to load or unload objects into or from a truck or other container, including by:
determining based on said image data received from the camera that a selected object is too large or heavy to move with a single robotic arm; and
in response to the determination that selected object is too large or heavy to move with a single robotic arm, using the first robotic arm and the second robotic arm cooperatively to each grasp the selected object and move the selected object together along a trajectory while maintaining the selected object in the grasp of both the first robotic arm and the second robotic arm.

* * * * *